United States Patent [19]
Sircar et al.

[11] Patent Number: 6,103,143
[45] Date of Patent: Aug. 15, 2000

[54] PROCESS AND APPARATUS FOR THE PRODUCTION OF HYDROGEN BY STEAM REFORMING OF HYDROCARBON

[75] Inventors: Shivaji Sircar, Wescosville; Jeffrey Raymond Hufton, Fogelsville; Shankar Nataraj, Allentown, all of Pa.

[73] Assignee: Air Products and Chemicals, Inc., Allentown, Pa.

[21] Appl. No.: 09/225,803

[22] Filed: Jan. 5, 1999

[51] Int. Cl.$^7$ .............................. C07C 1/02; C01B 3/24; C01B 3/26; B01D 59/26
[52] U.S. Cl. .......................... 252/373; 423/650; 423/652; 95/98
[58] Field of Search ..................................... 423/652, 650; 95/98; 252/373

[56] References Cited

U.S. PATENT DOCUMENTS

| | | | |
|---|---|---|---|
| 5,449,696 | 9/1995 | Dandekar et al. | 518/706 |
| 5,753,010 | 5/1998 | Sircar et al. | 95/45 |

OTHER PUBLICATIONS

Anand et al, Proc. U.S. DOE Hydrogen Program Rev. (1996), vol. 1, PP 537–552.
G. G. Vaporciyan, et al., "Equilibrium–Limited Periodic Separating Reactors", *AIChE Journal*, vol. 33, No. 8, pp. 1334–1343 (1987).
K. R. Westerterp, et al., "Two New Methanol Converters", *Hydrocarbon Processing*, pp. 69–73 (1988).
J. M. Berty, et al., "Beat the Equilibrium", *Chemtech*, pp. 624–629, (1990).
E. Kikuchi, et al., "Hydrogen Production From Methane Steam Reforming Assisted By Use of Membrane Reactor", *Natural Gas Conversion*, pp. 509–515, Elsevier Science Publishers B.V., Amsterdam (1991).
N. F. Kirkby, et al., "Pressure Swing Reaction—A Novel Process", 1991 Icheme Research Event, Department of Chemical and Process Engineering, University of Surrey, Guildford, Surrey, England.
S. Goto, et al., "Dehydrogenation of Cyclohexane in a PSA Reactor Using a Hydrogen Occlusion Alloy", Published in Part at 57$^{th}$ Conference of Chemical Engineering Society, Osaka (1992), *Chemical Engineering Essays*, vol. 19, No. 6 (1993).
B. T. Carvill, et al., "Sorption–Enhanced Reaction Process", *AIChE Journal*, vol. 42, No. 10, pp. 2765–2772 (1996).

*Primary Examiner*—Johann Richter
*Assistant Examiner*—J. Parsa
*Attorney, Agent, or Firm*—Mark L. Rodgers

[57] ABSTRACT

In the steam reforming of hydrocarbon, particularly methane, under elevated temperature and pressure to produce hydrogen, a feed of steam and hydrocarbon is fed into a first reaction volume containing essentially only reforming catalyst to partially reform the feed. The balance of the feed and the reaction products of carbon dioxide and hydrogen are then fed into a second reaction volume containing a mixture of catalyst and adsorbent which removes the carbon dioxide from the reaction zone as it is formed. The process is conducted in a cycle which includes these reactions followed by countercurrent depressurization and purge of the adsorbent to regenerate it and repressurization of the reaction volumes preparatory to repeating the reaction-sorption phase of the cycle.

24 Claims, 4 Drawing Sheets

PROCESS AND APPARATUS FOR THE PRODUCTION OF HYDROGEN BY STEAM REFORMING OF HYDROCARBON

RIGHTS OF THE UNITED STATES GOVERNMENT

The subject matter presented in this patent application was funded in part by the United States Department of Energy (DOE) under Cooperative Agreement No. DE-FC36-95G010059. The DOE may possess certain rights under the claims presented.

CROSS-REFERENCE TO RELATED APPLICATIONS

Not applicable.

STATEMENT REGARDING FEDERALLY SPONSORED RESEARCH OR DEVELOPMENT

The subject matter presented in this patent application was funded in part by the United States Department of Energy (DOE) under Cooperative Agreement No. DE-FC36-95G010059. The DOE may possess certain rights under the claims presented.

BACKGROUND OF THE INVENTION

This invention relates to the production of hydrogen by steam reforming hydrocarbons. In another aspect it relates to a process for steam reforming methane using a particulate contact catalyst and an adsorbent in combination. In still another aspect it relates to apparatus suitable for steam reforming of methane to produce hydrogen.

The most common industrial process for the production of hydrogen involves steam-methane reforming (SMR) or steam reforming of naphtha. In the SMR process a gaseous mixture of steam and desulfurized light hydrocarbons (natural gas or naphtha) is fed to a reactor containing several tubes packed with particulate catalyst inside a reforming furnace which converts the feed material to a product of about 70 to 72 mole percent hydrogen, 6 to 8 percent unconverted methane, 8 to 10 percent carbon dioxide, and 10 to 14 percent carbon monoxide, all on a dry basis. This product stream is cooled and fed to another packed bed of catalyst for adiabatic conversion by the water-gas shift reaction (WGS) which increases the hydrogen content to 71–75 percent and the $CO_2$ to 15–20 percent while reducing the methane content to 4–7 percent and the CO to 1–4 percent, all on a dry basis. Water present in this product is separated by condensation and normally the hydrogen is further purified by pressure swing adsorption (PSA). Although high purity hydrogen (98–99.999% $H_2$) can be made by this process using PSA with a hydrogen recovery of 70–90 percent, the capital cost is very high because of the high temperatures (750–900° C.) required in the SMR reactor, the heat recovery operations that are necessary, and the complex design of multistep, multicolumn PSA purification. Even though this process of $H_2$ production is currently the best economic option, it is well recognized that reduction of this capital investment is highly desirable in order to lower the cost of hydrogen which is in great demand, particularly in refinery, space exploration, fuel cell application, and the chemical industry. Many attempts have been made in the past decade to solve this problem.

One of the difficulties involved in the above described process for $H_2$ production is the reversible nature of SMR and WGS reactions which present equilibrium limitations on the purity of the product streams from the SMR and WGS reactors. In other processes limited by equilibrium in the principal reactions, efforts have been made to drive the reaction toward the product by separating one of the product components from the reaction system as soon as the product is formed. For example, Vaporciyan and Kadlec, "Equilibrium-Limited Periodic Separating Reactors", *AIChE Journal*, Vol. 33, No. 8 (1987) describe the use of a mixture of catalyst and adsorbent in a reactor operated like a single bed PSA operation for heterogeneous catalytic gas phase reactions. They discuss reaction-sorption equilibrium models on a theoretical level but do not apply the system to any particular process.

Westerterp et al., "Two New Methanol Converters", *Hydrocarbon Processing*, (Nov. 1988) describe a process for manufacture of methanol from synthesis gas wherein product as it is formed is removed from the catalyst surface by adsorption by continuously trickling adsorbent over the catalyst bed. This procedure is compared with an alternative process wherein conversion is carried out in a series of reactors with inter-stage product removal in adsorbers. Berty et al., "Beat the Equilibrium", *Chemtech*, (October 1990) describe the use of inert solvent to absorb methanol as soon as it is formed over a catalyst bed in a methanol synthesis process, thereby shifting reaction equilibrium toward the product. Mention is made of the alternative use of fine adsorbent powder to perform the same function.

Other simultaneous separation procedures have been suggested, such as the use of membrane separation of product from the reaction site in order to shift reaction equilibrium. Kikuchi et al. describe this approach for steam reforming of methane to produce hydrogen; see "Hydrogen Production from Methane Steam Reforming Assisted by Use of Membrane Reactor", *Natural Gas Conversion*, pp 509–515, Elsevier Science Publishers B. V., Amsterdam (1991).

Kirkby and Morgan of the Department of Chemical and Process Engineering, University of Surrey, Guildford, Surrey, England, in a paper titled "Pressure Swing Reaction—A Novel Process" for The 1991 Icheme Research Event, describe a PSA reactor as a new and untested device combining reaction and separation in a plant resembling a PSA system. Using a mathematical model for a single reactant "A" in an inert carrier gas reacted to form a product "B" which alone is adsorbable, the authors consider limitations on using some of the product stream as a purge stream after depressurization of the reactor and as a fluid to partially repressurize the reactor beds. Predictions are made that this procedure has a future in ethylene production because of its advantages over thermal cracking.

Adaptation of such a process for the dehydrogenation of cyclohexane was suggested by Goto et al. in "Dehydrogenation of Cyclohexane in a PSA Reactor Using a Hydrogen Occlusion Alloy", published in part at the 57th conference of the Chemical Engineering Society, Osaka, Japan, April 1992, *Chemical Engineering Essays*, Vol. 19, No. 6 (1992). Periodic regeneration of the adsorbent in simultaneous reaction-separation processes is described and the use of staggered phases employing multiple reactors to permit continuous operation is suggested.

U.S. Pat. No. 5,449,696, Dandekar et al., (1995) describes methanol production using a simulated moving bed of catalyst and adsorbent which separates methanol as it is formed from the reactants, $H_2$ and CO. Desorption of methanol from the adsorbent is achieved by using $CO_2$, $H_2$ or methane at a temperature lower than the reaction temperature. Reactant desorbents are said to suppress back reaction of methanol and can be separated from the methanol and reused in the reaction. It is suggested that this process can be used in combination with other reactions such as desulfurization and reforming of methane with $O_2$ to produce hydrogen.

Carvill et al., "Sorption-Enhanced Reaction Process", *AIChE Journal*, Vol. 42, No. 10 (1996) describe an improved process for equilibrium limited reactions for which they give the acronym "SERP". The process discussed uses simultaneous reaction and separation in a single operation with a mixture of catalyst and adsorbent in a fixed packed column in order to carry out a reverse water gas shift reaction for the production of CO. The process goes through the steps of (1) simultaneous catalytic reaction of $CO_2$ with hydrogen and adsorption of product water with recovery of pure CO, (2) countercurrent depressurization, (3) countercurrent purge with a weakly adsorbed gas such as nitrogen, (4) countercurrent purge with CO, and (5) repressurization of the column with CO. The authors also discuss reaction and sorption dynamics within three zones in the reactor including two reaction mass transfer zones located at the feed and product ends of the column. It is also suggested that steam-methane reforming for the production of hydrogen is a candidate for SERP. Additional refinements in such processes are highly desirable to reduce product cost still further and improve the overall economy of the operations.

BRIEF SUMMARY OF THE INVENTION

We have discovered that the efficiency of steam-hydrocarbon reforming in the production of hydrogen can be significantly improved by a combination of one or more procedures involving catalyst bed configuration, reaction temperature control and use of specific purge and repressurization fluids.

According to our invention, steam-hydrocarbon reforming is carried out by contacting a feed of steam and hydrocarbon, preferably methane or natural gas or naphtha, with a suitable particulate catalyst in a fixed bed under reforming conditions of elevated temperature and pressure to produce carbon dioxide, hydrogen, and carbon monoxide. As these products are formed, carbon dioxide is separated from the product gas by adsorption on particulate adsorbent initially mixed with the catalyst, thereby displacing reaction equilibrium toward product formation. The adsorbent is periodically regenerated by depressurization of the catalyst and adsorbent bed to near or below atmospheric pressure, which results in the removal of interparticle void gas with some carbon dioxide being desorbed from the adsorbent under the conditions of reduced pressure, the gases exiting the bed in a flow direction countercurrent to the flow of reactants. Further desorption is achieved by passing a weakly adsorbed purge gas over the adsorbent countercurrently to the flow of reactants. The catalyst and adsorbent bed is optionally purged again with a nondeleterious gas to remove the prior purge gas and then repressurized with a suitable fluid which does not adversely affect the continuation of the reaction over the regenerated bed. In this process, the efficiency of the operation is improved significantly by configuring the catalyst-adsorbent bed so that the feed initially contacts essentially only catalyst in a first zone of reaction, following which the partially reacted feed passes into a second reaction zone containing a mixture of both catalyst and adsorbent.

As a consequence of this unique bed configuration, the overall bed efficiency is improved in subsequent cycles for reasons which will be explained in the detailed description of the invention. Also, the total volume of interparticle voids in the reactor is reduced, thereby decreasing void gas losses in the depressurization step of the process. As an additional benefit, this configuration with a catalyst-only section in the feed end of the bed, permits more efficient reforming of methane containing hydrocarbons having two or more carbon atoms by providing a section in which such higher hydrocarbons can be converted to methane and carbon oxides.

Preferably the process with the bed configuration as described above is operated at temperatures which increase modestly over the length of the bed from feed end to product end. Operating within a temperature range of about 300 to 550° C., an increasing temperature gradient of less than 100° C., and preferably about 20 to 70° C., over the length of the reactor bed yields an increase in conversion of methane to hydrogen, increases $CO_2$ which is adsorbed, and decreases CO in the product hydrogen. These benefits can be enjoyed without increasing the capital investment in the plant.

As an additional feature of our invention, the catalyst bed is purged and repressurized with steam, preferably containing a small amount of hydrogen, for example about 3 to 30 mole percent, which serves as a reducing gas to protect the catalyst from oxidation. By the use of steam for both purging the adsorbent and repressurizing the catalyst bed, the presence of components that will contaminate the product hydrogen is avoided and an additional purge with hydrogen to eliminate such components is rendered unnecessary. This feature of our invention can be employed independently from the catalyst bed configuration and temperature gradient aspects, but is preferably used in combination with them.

The apparatus of the invention is a tubular reaction chamber having means for introducing (stream and methane or natural gas) feed gas at one end and means for removing product hydrogen from the other end. In one embodiment, this chamber contains a mixture of catalyst and adsorbent configured so that a section of the chamber at the feed end contains essentially catalyst only and an intimate mixture of catalyst and adsorbent is contained in the rest of the chamber. The ratio of catalyst to adsorbent in the second section is between 5:1 and 1:5. Preferably the catalyst only section makes up about 5 to 40 percent of the chamber volume while the section containing the mixture of catalyst and adsorbent fills the balance of the chamber. The reaction chamber is equipped with means for supplying heat to the catalyst bed. This apparatus is suitable for carrying out the process of the invention described above.

DETAILED DESCRIPTION OF THE INVENTION

Figure 1:
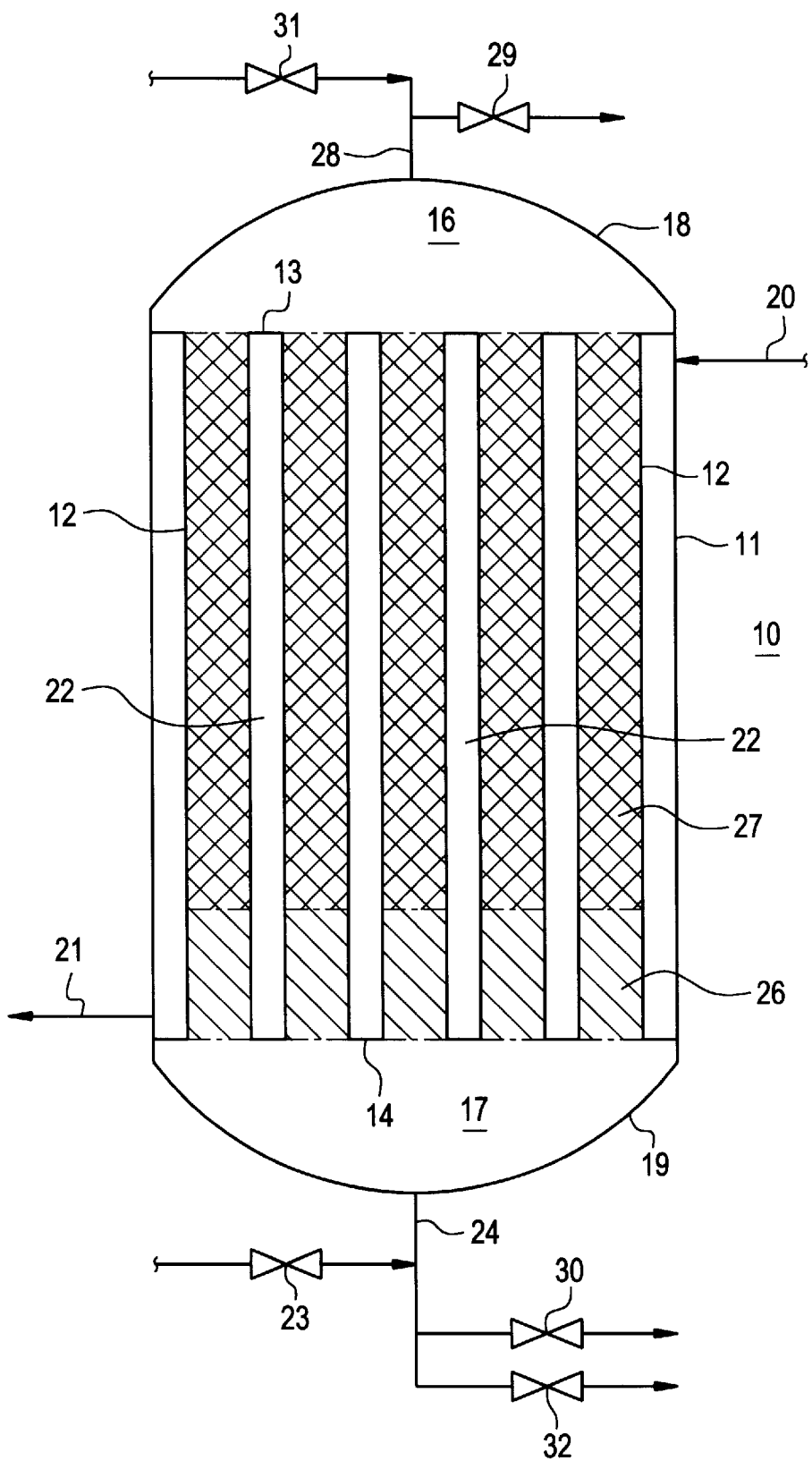
FIG. 1 is a schematic illustration of a shell and tube reactor equipped with the catalyst-adsorbent bed configuration of the invention.

The present invention is an improvement in both the process and apparatus which are used in conducting equilibrium limited reactions. This technology is known by the acronym SERP standing for Sorption-Enhanced Reaction Process and is described in the Carvill et al. article cited in the Background section above. The particular SERP process to which this invention is directed is the steam reforming of hydrocarbons, including methane, natural gas, naphtha, and the intermediate hydrocarbons, for example $C_1$ to $C_8$ hydrocarbons, to produce hydrogen. The preferred process is the reforming of methane because the improvements in reaction efficiency and reduced capital cost are realized most favorably with the use of methane feedstock, which can include higher hydrocarbons in small amounts, as in natural gas.

The reforming reaction utilizes a mixture of particulate reforming catalyst and particulate carbon dioxide adsorbent (chemisorbent) and a feed of steam and methane in a molar ratio of steam to carbon (associated with hydrocarbons only) greater than 2 to 1 in order to prevent coking on the catalyst and adsorbent. Preferably, the steam to carbon mole ratio in the feedstock is in the range of 2:1 to 8:1. The reaction is carried out at an elevated pressure, preferably in the range of 50 to 300 psig, and at a temperature which does not exceed 550° C. This is a relatively low temperature for conventional steam reforming, but if higher temperatures are used the cost of the operation increases radically because of the need for more expensive metallurgy in the reactors and associated equipment. Preferably, the temperature at which the reaction is conducted is in the range of 300 to 500° C., and temperatures of 400 to 500° C. are even more preferred.

Steam-methane reforming catalysts are well known in the art, and any of the commonly used catalysts of this type can be used in the invention. Examples of such catalysts include nickel-alumina, nickel-magnesium alumina and the noble metal catalysts. The adsorbent is one which can sorb carbon dioxide in the presence of steam at the temperature and pressure of the reaction, either by physical or chemical sorption, and release the sorbed carbon dioxide at the same temperature but under reduced partial pressure of carbon dioxide in the ambient gases. The adsorbent should be effectively non-catalytic and otherwise inert as to reactions between components of the feedstock and products as well as to any purge or pressurizing gases so as to avoid any significant occurrence of side reactions. Adsorbents for carbon dioxide include the metal oxides and mixed metal oxides of magnesium, manganese, lanthanum and calcium and the clay minerals such as sepiolite and dolomite. Preferably, the adsorbent is one of a class of materials defined as modified double layered hydroxides and non-modified and modified spinels which are capable of selectively adsorbing $CO_2$ from gaseous streams containing high water (steam) levels such as exist in the steam reforming process.

The preferred modified double layered hydroxides are represented by the formula:

$$[Mg_{(1-x)}Al_x(OH)_2][CO_3]_{x/2} \cdot yH_2O \cdot zM'_2CO_3$$

wherein $0.09 \leq x \leq 0.40$; $0 \leq y \leq 3.5$; $0 \leq z \leq 3.5$; and M'=Na or K.

The spinels and modified spinels are represented by the formula:

$$Mg[Al_2]O_4 \cdot yK_2CO_3$$

wherein $0 \leq y \leq 3.5$. The modified spinels are identified by the materials wherein y is greater than zero, and the spinels which are not modified are represented by the formula wherein y equals zero.

The catalyst and adsorbent are preferably in granular form or pelletized so that they can be readily mixed and not tend to stratify during the operation. Such granules can be suspended in a porous matrix or in a free form. Other methods of securing the catalyst and adsorbent in fixed beds can be employed provided they do not impede access of the feed and product gases to the surfaces of these materials.

Steam reforming of methane to produce hydrogen under the conditions of the invention includes both the steam reforming reaction (SMR) and the water gas shift reaction (WGS). Both of the reactions are reversible and proceed according to the following equations:

$$CH_4 + H_2O \leftrightarrow CO + 3H_2 \quad \text{endothermic SMR}$$

$$CO + H_2O \leftrightarrow CO_2 + H_2 \quad \text{exothermic WGS}$$

Although the SMR reaction is thermodynamically favored at very high temperatures (e.g. 800–900° C.) which would require expensive reactor metallurgy, by using the SERP process good conversions of methane to hydrogen and direct production of high $H_2$ product purities can be achieved under much milder conditions. The WGS reaction proceeds well at the lower temperatures in the range used by the process of the invention. Equilibrium constants for both reactions can be expressed as follows:

$$K_{SMR}(T) = P^2 \cdot (y_{H2})^3 (y_{CO}) \div (y_{CH4})(y_{H2O})$$

$$K_{WGS}(T) = (y_{CO2})(y_{H2}) \div (y_{CO})(y_{H2O})$$

where P is the reaction pressure and y is the gas phase mole fraction of the component indicated by the subscript in the reactor under equilibrium. The equilibrium constants (K) are functions of temperature only. Tables 1 and 2 show how these constants change with temperature (T).

TABLE 1

Steam-Methane Reforming Equilibrium Constants
ΔH(400° C.) = +52.5 kcal/mole (endothermic)

| T(° C.) | $K_{SMR}$ (atm$^2$) |
|---|---|
| 400 | 0.0000585 |
| 450 | 0.000891 |
| 500 | 0.00966 |
| 550 | 0.0792 |
| 600 | 0.514 |
| 700 | 12.4 |
| 800 | 167.0 |
| 900 | 1450.0 |

TABLE 2

Water Gas Shift Reaction Equilibrium Constants
ΔH(400° C.) = −9.0 kcal/mole (exothermic)

| T(° C.) | $K_{WGS}$ (dimensionless) |
|---|---|
| 400 | 12.4 |
| 450 | 7.77 |
| 500 | 5.22 |
| 550 | 3.69 |
| 600 | 2.73 |
| 700 | 1.66 |

TABLE 2-continued

Water Gas Shift Reaction Equilibrium Constants
ΔH(400° C.) = -9.0 kcal/mole (exothermic)

| T(° C.) | $K_{WGS}$ (dimensionless) |
|---|---|
| 800 | 1.12 |
| 900 | 0.814 |

The variable ΔH represents the heat of the reaction at 400° C. The overall reaction in the SMR reactor is endothermic. From the above thermodynamic data it is apparent that $K_{SMR}$ decreases exponentially with decreasing temperature (T) while $K_{WGS}$ increases with decreasing temperature. The SERP process permits one to capitalize by operating the SMR reaction at relatively low temperatures (300 to 550° C.) and offsetting the disadvantage of lower $K_{SMR}$ constants by adsorption and removal of $CO_2$ from the reaction zone as it is formed. From the equations for the equilibrium constants, it can be seen that a decrease in gas phase $CO_2$ concentration from the reaction zone produces a corresponding decrease in CO concentration, and a decrease in CO concentration produces an increase in $H_2$ concentration. The overall result is improvement in methane conversion to hydrogen and improved hydrogen product purity. The subject invention is able to capitalize on these benefits of the SERP process and make additional improvements.

The procedure to be followed in practicing our invention is to carry out the following steps:

Step (a): A feed stream of steam and hydrocarbon suitable for steam-hydrocarbon reforming to produce hydrogen is passed into a first reaction zone containing particulate material consisting essentially of reforming catalyst alone under conditions of temperature and pressure effective to convert a portion of said steam and hydrocarbon into carbon dioxide, hydrogen, and carbon monoxide, as well as conversion of heavier hydrocarbons to methane. This first reaction zone is preferably the volume within a tubular chamber (such as a tube in a shell and tube reactor) into which the feed stream initially passes as it enters the reactor. Only catalyst is present in this first zone which is essentially free of adsorbent.

The effluent gas from said first reaction zone is then passed into a second reaction zone containing particulate material which consists essentially of a mixture of reforming catalyst and adsorbent capable of selectively separating carbon dioxide by adsorption from steam, hydrocarbon, and hydrogen under the prevailing conditions. This second reaction zone is preferably the volume in the remainder of the tubular chamber described for step (a). Ideally the first zone occupies about 5 to 40 percent of the volume of such a tubular chamber and the second zone occupies the balance. A first zone which is 10 to 30 percent of the reaction chamber volume is even more preferred.

Conditions of temperature and pressure in said second reaction zone are maintained essentially the same as in said first reaction zone. The $CO_2$ that is formed by reaction of steam and hydrocarbon in the first and second reaction zone is selectively adsorbed by the adsorbent in the second zone. Thus the carbon dioxide as it is formed in the reforming reaction is separated from the reactants and from the hydrogen product.

Hydrogen is withdrawn as product from the second reaction zone. The above-described four functions constitute the reaction-sorption phase of the total cycle and together are carried out during a first time interval. At the close of this first time interval, the following steps proceed in sequence.

Step (b): The pressure in both the first and second reaction zones is let down to approximately atmospheric pressure or subatmospheric pressure in such a way that gases swept from the interpartical spaces and some carbon dioxide released from the adsorbent flow in a direction countercurrent to the flow of reactants and product during the reaction phase. Consequently, gases from the second reaction zone flow through the first zone on their way out of the reaction chamber. The pressure reached in this step is between 100 torr and 5 psig. This depressurization occurs over a second time interval.

Step (c): At the end of the second time interval, a purge gas is introduced into the second reaction zone, flowing through that zone and the first zone in a direction countercurrent to the flow of gases in step (a). The purpose of this purge gas is to further desorb carbon dioxide from the adsorbent and, in effect, regenerate the adsorbent so that it can be reused in subsequent cycles. The purge gas can be any nondeleterious gas which does not contain carbon dioxide. For example, this gas can be methane, nitrogen, steam or hydrogen or mixtures thereof. This purge step is carried out under the reduced pressure conditions of step (b) for a third time interval.

Step (d): At the end of the third time interval, the reaction zones are repressurized to a suitable reaction pressure by introducing a pressurizing gas which preferably is steam, hydrogen or mixtures thereof. The hydrogen may be part of the reaction product produced in step (a) from this reactor or from another reactor. This repressurization occurs over a fourth time interval. At the beginning of this fourth time interval and before repressurization is begun, it is sometimes desirable to carry out a second purge in the same manner as the first but with hydrogen, if hydrogen and steam have not been used in the first purge. The purpose of this second purge is to sweep out the prior purge gas, such as methane, nitrogen or steam, before renewing the reaction in another cycle.

Step (e): At the close of the fourth time interval, steps (a) through (d) are repeated. At least two or more parallel reactors (packed beds) are needed to operate the SERP process in a continuous manner so that the feed reactants are introduced and product $H_2$ is withdrawn in a continuous stream. For example, the reaction-sorption phase, step (a), can be carried out in a first reactor while steps (b) and (c) are carried out in a second reactor and step (d) including the hydrogen purge is carried out in a third reactor. Repeated cycles for this sequence would be as illustrated in Table 3.

TABLE 3

| Reactor 1 | Sorption-Reaction | Depressurize | Purge | $H_2$ Purge | Pressurize |
|---|---|---|---|---|---|
| Reactor 2 | $H_2$ Purge | Pressurize | Sorption-Reaction | Depressurize | Purge |
| Reactor 3 | Depressurize | Purge | $H_2$ Purge | Pressurize | Sorption-Reaction |

The length of each time interval in a case as illustrated in Table 3 will be determined primarily by the first time interval for the sorption-reaction phase of the cycle. This, in turn, will be determined by the size of the reaction chamber, and the volume and reactivity of the catalyst and capacity of the adsorbent to adsorb $CO_2$ under the conditions of temperature, pressure, and feed composition prevailing. It is desirable to carry out the reaction-sorption phase of the cycle until unreacted hydrocarbon and/or carbon oxides begin to show up in the product hydrogen in undesirable quantities. The amount of such impurities tolerated will depend upon the desired use for the hydrogen since some uses require much higher purities than others. For example, it would be satisfactory in most cases to terminate the reaction-sorption phase of the cycle as soon as carbon oxides in the product hydrogen reach 50 ppm or the methane content reaches 5 mole percent.

As stated above, it is preferred to carry out the process of the invention in apparatus having the structure of a shell and tube reactor, as illustrated schematically in FIG. 1. Referring now to FIG. 1, reactor 10 has a shell 11 and multiple elongated tubes 12 of like size and shape. These tubes extend through tube sheets 13 and 14, communicating with volumes 16 and 17 enclosed by reactor heads 18 and 19, respectively. Reactor 10 is equipped with lines 20 and 21 which serve as means for entry and exit, respectively, of heating fluid which supplies necessary heat for the endothermic reaction of steam-methane reforming and the carbon dioxide desorption process. Lines 20 and 21 communicate with the shell volume 22 surrounding tubes 12.

Heat can be supplied for the reaction by other means using different reaction chamber designs. In the embodiment shown, the reaction can be carried out under isothermal conditions by using a condensing heat transfer fluid which enters the reactor shell as vapor near its condensation temperature and supplies heat for the reaction and for the purge and other steps of the cycle by giving up its heat of vaporization as needed by condensation on the outside walls of tubes 12. Heat transfer fluids capable of phase change by condensation and suitable for this process are commercially available, such as Dowtherm A of Dow Chemical Company or Therminol VP-1 of Solutia Company. Alternatively, heat can be supplied with a noncondensing fluid, such as flue gas generated by combustion of a fuel such as natural gas. In this case, the heating fluid gives up its sensible heat as it passes through the shell of the reactor and consequently changes temperature from entry to exit. This produces a temperature gradient within the reactor itself, either decreasing or increasing in the direction of reactant flow, depending upon whether the hot flue gas flows concurrently or countercurrently to the flow of reactants. It is much to be preferred in the practice of the process of this invention that a temperature gradient be established increasing in the direction of reactant flow from the feed entry point to product exit. The temperature of the reaction is to be maintained within the range to 300 to 550° C., preferably 400 to 500° C., with a modest temperature gradient rising in the direction of reactant flow. This gradient should not exceed 100° C. and preferably is held to a 20 to 70° C. increase in reaction temperature along the length of the catalyst-sorbent bed, but within the overall range of temperature given. Although less practical, heat for the reaction can be supplied by circulating heating fluid through separate heating tubes running through the catalyst beds, or through jackets surrounding individual tubes, or with electrical heaters on the outside or inside of the chambers containing the reaction catalyst.

Referring again to FIG. 1, feed of steam and methane (natural gas) enters reactor 10 through valve 23 and line 24, passing into volume 17 which distributes the feed gases to tubes 12. Tubes 12 are filled with catalyst and adsorbent in the configuration represented by hatching and cross-hatching within the tubes as illustrated. Catalyst only 26 is represented by single hatching in the initial 5 to 40 volume percent of the tubes and a mixture of catalyst and adsorbent 27 is represented by cross-hatching in the remaining 60 to 95 volume percent of the tubes. The feed as it enters the reactor initially contacts the catalyst only and the reforming reaction begins, producing carbon dioxide, hydrogen, and carbon monoxide. These products and unreacted feed then enter the sections of the tubes containing both catalyst and adsorbent and the reaction continues with carbon dioxide being selectively removed from the reaction zone as soon as it is formed due to sorption by the adsorbent.

By the time the reactants reach near the ends of the tubes, almost all of the hydrocarbons have reacted and essentially all the carbon dioxide formed has been adsorbed. Practically pure hydrogen product on a dry basis enters volume 16 and exits the reactor through line 28 and valve 29.

As soon as a preset level of breakthrough of methane or carbon oxides or both is detected in the product gas, the reaction-sorption phase of the cycle (step (a)) is terminated and depressurization (step (b)) begins by closing valves 23 and 29 and opening valve 30. Exhaust gases containing methane, hydrogen, carbon oxides and steam exit the reactor through line 24 and valve 30, passing to other uses, such as for fuel. After the pressure has dropped to about atmospheric or vacuum within the tubes, valve 30 is closed and a purge gas is introduced through valve 31 and line 28. This purge gas and the carbon dioxide it removes from the adsorbent pass out of the reactor through line 24 and valve 32. If desired, a vacuum pump, not shown, can be used to attain subatmospheric pressures for the depressurization and purge steps. An optional second purge with hydrogen can be carried out in the same manner with an additional valve at the product side of the reaction (line 28). At this point, when all purging is complete, valve 32 is closed and the reactor is repressurized by introduction of steam, product hydrogen, or a mixture of the two through valve 31 and line 28 or valve 32 and line 24. When repressurization is complete, valve 31 and valve 32 are closed and valves 23 and 29 are opened to repeat the reaction-sorption phase of the cycle.

Figure 2:
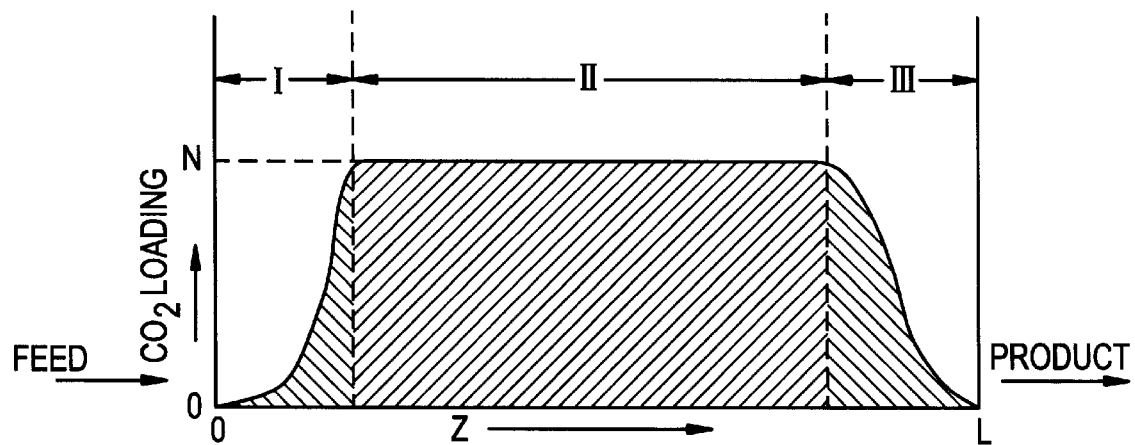
FIG. 2 is a schematic graph for comparison to prior art showing the instantaneous $CO_2$ adsorption (loading of $CO_2$) profile as a function of distance z during reaction step at any point along the length of a catalyst bed wherein catalyst and adsorbent are mixed throughout the bed.
Figure 3:
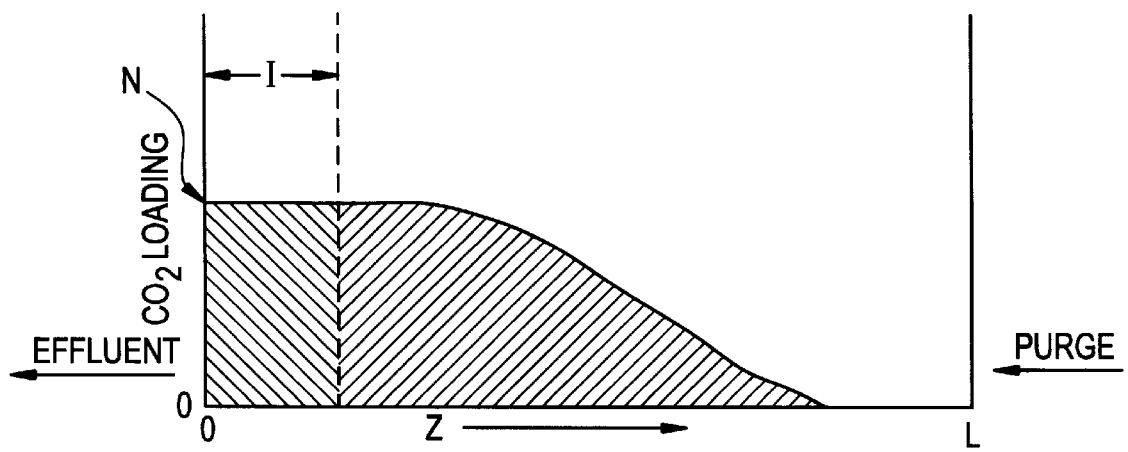
FIG. 3 illustrates the $CO_2$ adsorption (loading of $CO_2$) profile as a function of distance z following that of FIG. 2, after the depressurization and purge steps.
Figure 4:
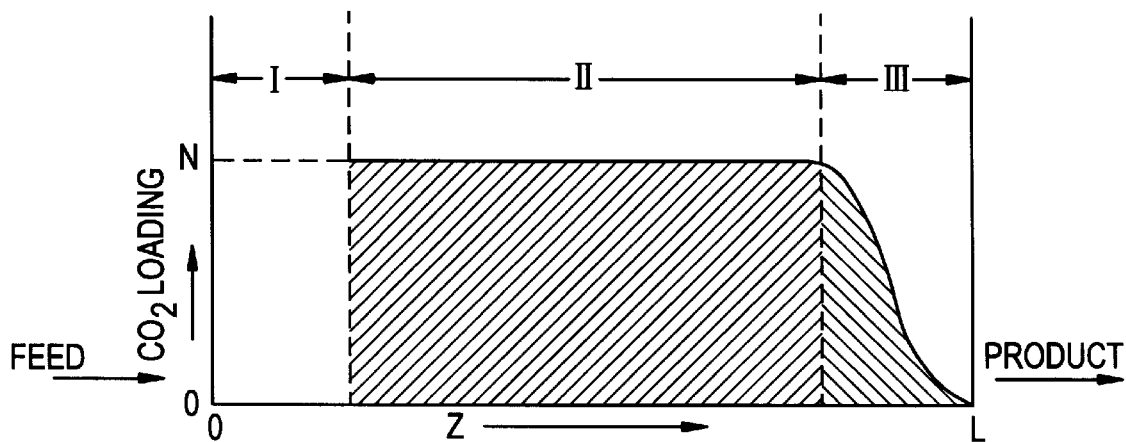
FIGS. 4 and 5 illustrate profiles corresponding to FIGS. 2 and 3, respectively, but using the bed configuration feature of the invention.
Figure 5:
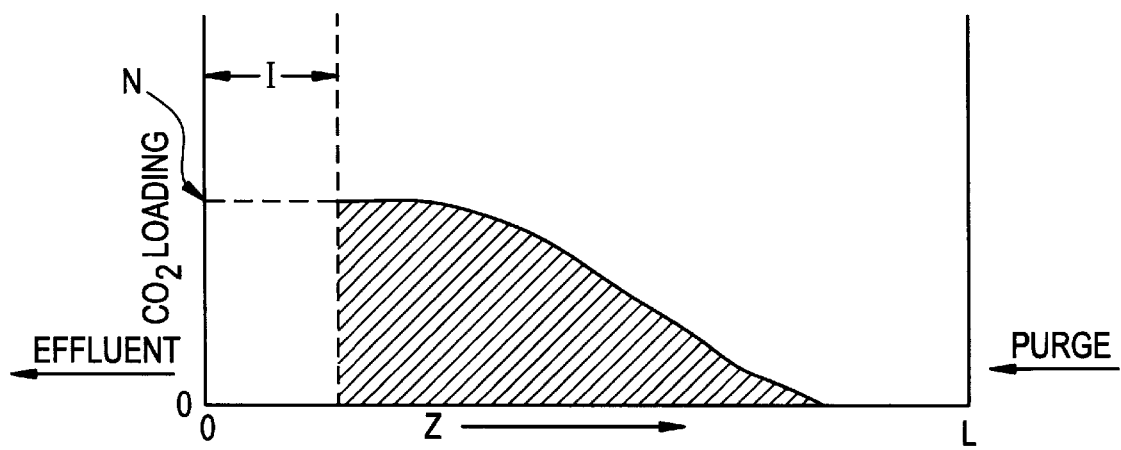

We have found that the dynamics of this type of reaction cycle are such that clear advantages can be realized by using the catalyst and adsorbent configuration described above. These advantages can best be explained by referring to FIGS. 2, 3, 4, and 5 which are graphs showing in schematic style the instantaneous $CO_2$ adsorption profile (adsorbate loading) within the reactor tubes as a function of the distance "z" from the feed entry point, measured along the tubes having length "L". The area under the curves of FIGS. 2 through 5 represents the amount of $CO_2$ adsorbed on the adsorbent along the length of the reactor tubes at particular intervals in the process cycle. FIGS. 2 and 3 represent prior art and are included for comparison purposes, and FIGS. 4 and 5 represent the invention.

Referring now to FIG. 2, the graph shows three distinct zones which exist in each reactor tube when it is filled with a mixture of catalyst and adsorbent throughout its length. The point in the process illustrated is at the close of the first sorption-reaction phase under cyclic, steady state operation of the SER process. The zones, indicated as I, II, and III, together extend over the full length of the tube. Zones I and III are reaction mass transfer zones (RMTZ) and zone II is a thermodynamic equilibrium zone (TEZ). Feed material enters the tube at point 0 on the horizontal axis of FIG. 2. In zone I, the reaction is just beginning and $CO_2$ formation and adsorption starts. The reaction proceeds to equilibrium under the prevailing conditions within the tube and the amount of $CO_2$ adsorbed (loading on sorbent) becomes constant at value N over most of the tube length. This condition is shown as zone II, the TEZ. The value of N is controlled by the system temperature (T), pressure (P), and the mole fraction of $CO_2$ ($y_{CO2}$) that would be produced under thermodynamic equilibrium conditions if the feed of steam and methane (natural gas) were passed over the catalyst without the presence of chemisorbent. Thus, $y_{CO2}$ represents the mole fraction of $CO_2$ corresponding to thermodynamic equilibrium conversion (without chemisorbent) of methane to carbon dioxide by the SMR/WGS reactions at the pressure (P) and temperature (T) prevailing in the reactor and for the same feed composition of steam and methane (natural gas). The quantity "N" represents the equilibrium $CO_2$ adsorption capacity of the chemisorbent at P, T and $y_{CO2}$.

Near the end of the tube most of the methane has been converted to $H_2$ and the available $CO_2$ for sorption declines, finally reaching essentially zero at the end of the tube where product hydrogen is removed. In this zone III, the $CO_2$ adsorption by the adsorbent goes from a value of N to essentially zero. The ideal situation is shown in FIG. 2 since the $CO_2$ available for sorption reaches essentially zero right at the end of the tube. It should be understood that, depending upon the duration of the first time interval for step (a), zone III can terminate before reaching the end of the tube. The length of the middle zone II (TEZ) increases with longer times as the reaction is permitted to continue. If some $CO_2$ may be permitted in the product hydrogen, a part of zone III can be allowed to exit the reactor at the end of step (a). FIG. 2 is presented for comparison with the invention, and does not represent the invention.

Continuing with the comparison of a process which represents the prior art but not the invention, FIG. 3 shows the $CO_2$ adsorption profile (loading on chemisorbent) in the reactor at a later point in the cycle following the condition of FIG. 2. FIG. 3 illustrates $CO_2$ sorption profile in the reactor tube at a point in the cycle immediately following the purge step (c), prior to repressurizing the reactor (step (d)) in order to repeat the sorption-reaction phase. The entire tubular reactor, in this case, becomes a mass transfer zone. It is not practical to continue the purge step or steps until all the $CO_2$ is desorbed from the adsorbent. To do so would require an unreasonable quantity of purge gas and purge time. Consequently, at the end of the purge step some of the adsorbent is left at least partially loaded with $CO_2$. Moreover, as shown in FIG. 3, since the adsorbent in zone I was not saturated with $CO_2$ at the end of the sorption-reaction phase, and since the depressurization and purge steps cause desorbed $CO_2$ from zones II and III to flow through zone I in order to exit the tube, the adsorbent in zone I becomes saturated with readsorbed $CO_2$ at the equilibrium value N.

The significance of the condition of FIG. 3 is that at the beginning of the next cycle when fresh feed is introduced into zone I, $CO_2$ is desorbed (purged) from the adsorbent in zone I until the $CO_2$ held in zone I approaches the situation depicted in FIG. 2. This $CO_2$ purged from zone I flows into zone II and is readsorbed by the adsorbent in that zone, thereby reducing the capacity of adsorbent in zone II and shortening the time interval over which the sorption-reaction phase of the second and subsequent cycles can continue without reducing the purity of the product. The result is reduced efficiency of the process because a substantial quantity of $CO_2$ is simply shifted back and forth within the reactor with each repeating cycle, using adsorbent capacity that is effectively taken out of service. The adsorbent, catalyst and equipment are, therefore, underutilized.

FIGS. 4 and 5 show the corresponding $CO_2$ adsorption profiles as FIGS. 2 and 3, respectively, but for the process and apparatus of the invention. In FIGS. 4 and 5, it can be seen that in a space within the tubes of the reactor corresponding to zone I in FIG. 2 there is no $CO_2$ being adsorbed. Of course, the reason for this is that there is no adsorbent in this initial zone within the tubes, this volume containing catalyst only according to the catalyst-adsorbent configuration requirement of the invention. Since a relatively little amount of $CO_2$ is adsorbed from the $CO_2$ generated by reaction over the catalyst in this zone I compared to zone II anyway (as shown in FIG. 2), there is not a significant disadvantage to the process in not having adsorbent in this initial zone. What disadvantage does exist is much more than offset by eliminating the $CO_2$ stored in this zone during the purge steps of the cycle. This advantage of the invention is illustrated in FIG. 5 which shows the condition in the reaction tubes at the end of the purge steps in the cycles carried out according to the invention. Here it can be seen that no $CO_2$ is stored in zone I so that there is no $CO_2$ to be desorbed and shifted into zone II in the subsequent sorption-reaction step. As a result, when practicing the SERP process as described in accordance with the invention, hydrocarbon conversions are higher, product purity is improved, and the efficiency of the process is improved as a result of making more efficient use of the equipment.

As an additional benefit arising from the use of the catalyst-sorbent configuration of the invention, if the feed of steam and hydrocarbon contains any higher hydrocarbons which could cause coking and reduce the effectiveness of the sorbent, such higher hydrocarbons tend to be converted to methane and carbon dioxide under the reaction conditions by contact with the reforming catalyst only in the initial section of the reactor tube.

As stated above, the preferred mode of controlling the temperature for the process is to maintain the temperature within the range of 300 to 550° C. throughout the entire cycle of sorption-reaction, depressurization, purge and pressurization, with a modest temperature gradient of 20 to 70° C. from the feed entry point into the catalyst bed to the product exit. Keeping the average temperature within the range below 550° C. enables significant savings in the materials of construction for the reactor, while the temperature gradient permits one to take advantage of more favorable equilibrium gas phase compositions and $CH_4$ to $H_2$ converions which exist at modestly higher temperatures. This point can best be illustrated by referring to the data of Tables 4 and 5. These data show equilibrium methane conversion and gas phase composition for the reforming and shift reactions performed in an isobaric batch reactor (or steady state plug flow reactor) using a 4:1 steam-methane mole ratio at 400 to 500° C. and pressure levels of 50 psig (Table 4) and 250 psig (Table 5).

TABLE 4

| P | T | % Methane | Equilibrium Gas Phase Composition (mole percent) | | | | |
|---|---|---|---|---|---|---|---|
| (psig) | °C. | Conversion | $H_2O$ | $CH_4$ | $H_2$ | $CO_2$ | CO |
| 50 | 400 | 18.29 | 70.62 | 16.34 | 10.42 | 2.58 | 0.031 |
| 50 | 410 | 19.96 | 69.78 | 16.01 | 11.36 | 2.81 | 0.041 |
| 50 | 420 | 21.71 | 68.89 | 15.66 | 12.35 | 3.05 | 0.054 |
| 50 | 430 | 23.56 | 67.95 | 15.29 | 13.39 | 3.30 | 0.070 |
| 50 | 440 | 25.49 | 66.98 | 14.90 | 14.47 | 3.55 | 0.090 |
| 50 | 450 | 27.50 | 65.97 | 14.50 | 15.60 | 3.81 | 0.116 |
| 50 | 460 | 29.59 | 64.93 | 14.08 | 16.76 | 4.08 | 0.147 |
| 50 | 470 | 31.76 | 63.85 | 13.65 | 17.96 | 4.35 | 0.186 |
| 50 | 480 | 34.01 | 62.74 | 13.20 | 19.20 | 4.63 | 0.233 |
| 50 | 490 | 36.34 | 61.60 | 12.73 | 20.47 | 4.90 | 0.290 |
| 50 | 500 | 38.73 | 60.44 | 12.25 | 21.78 | 5.18 | 0.358 |

TABLE 5

| P (psig) | T °C. | % Methane Conversion | Equilibrium Gas Phase Composition (mole percent) | | | | |
|---|---|---|---|---|---|---|---|
| | | | $H_2O$ | $CH_4$ | $H_2$ | $CO_2$ | CO |
| 250 | 400 | 10.80 | 74.46 | 17.84 | 6.16 | 1.53 | 0.010 |
| 250 | 410 | 11.83 | 73.93 | 17.63 | 6.74 | 1.68 | 0.014 |
| 250 | 420 | 12.91 | 73.38 | 17.42 | 7.36 | 1.83 | 0.018 |
| 250 | 430 | 14.06 | 72.79 | 17.19 | 8.01 | 1.99 | 0.024 |
| 250 | 440 | 15.27 | 72.18 | 16.95 | 8.70 | 2.15 | 0.031 |
| 250 | 450 | 16.54 | 71.53 | 16.69 | 9.41 | 2.32 | 0.039 |
| 250 | 460 | 17.88 | 70.86 | 16.42 | 10.17 | 2.50 | 0.050 |
| 250 | 470 | 19.28 | 70.15 | 16.14 | 10.95 | 2.69 | 0.064 |
| 250 | 480 | 20.74 | 69.42 | 15.85 | 11.77 | 2.88 | 0.080 |
| 250 | 490 | 22.26 | 68.65 | 15.65 | 12.62 | 3.08 | 0.101 |
| 250 | 500 | 23.85 | 67.86 | 15.23 | 13.50 | 3.28 | 0.125 |

The above data of Tables 4 and 5 show that even a small reaction temperature increase of a few degrees, e.g. about 20 to 70° C., within a temperature range of 400 to 500° C. increases the methane to hydrogen conversion significantly. Such a temperature increase also increases the mole percentage of $CO_2$ and CO in the reaction product, but, as described above, this can be dealt with by $CO_2$ adsorption. Also, such temperature increases result in a decrease in the mole percentage of methane in the reaction products. Applying a rising temperature gradient of 20 to 70° C. along the length of the reactor tubes can, therefore, provide improvements in reaction efficiency while keeping the temperatures to which the metal of the reactor structure is subjected within the desired range. Increasing the temperature toward the product end of the catalyst beds also has the advantage of imposing the highest temperature within that portion of the catalyst bed where the methane concentration is lowest, thereby tending to drive the reaction to completion.

This feature of rising temperature gradient along the reactor tubes in the direction of reactant flow cooperates with the catalyst-sorbent configuration feature of the invention to provide exceptional benefits in the overall efficiency of the SERP operation. As the data of Tables 4 and 5 show, the lowest concentrations of $CO_2$ in the gas phase composition occur at the lower temperatures which, according to the temperature gradient feature, will be in the initial zone I where there is catalyst only and no adsorbent to remove the $CO_2$ as it is formed.

With the temperature gradient feature applied, the appearance of the graph of FIG. 4 would be altered somewhat to show an upward slope to the curve in zone II. Because of the increasing temperature along the length of the catalyst bed, the equilibrium conditions for $CO_2$ adsorption change continuously in the direction of reactant flow. The adsorption capacity N in zone II will, in such a case, not be a constant, but will increase from zone I to zone III owing to the point by point difference in $y_{CO2}$ and the increasing conversion of methane to hydrogen as the temperature increases.

Still another benefit from the temperature gradient feature results during the purge phases of the reaction cycle since the temperature profile within the reactor is maintained throughout the sorption-reaction phase, depressurization, purge and repressurization. Consequently, $CO_2$ desorption efficiency at the product end of the reactor bed is improved because of the higher temperature maintained there, leading to less residual $CO_2$ in the adsorbent during the reaction phase of the cycle. This effect will improve the observed reactor conversion and product purity during the reaction-sorption step.

A practical method of imposing the temperature gradient along the reactor tubes is to flow hot gas countercurrently through the shell side of the reactor as depicted in FIG. 1. The gas enters the reactor 10 through line 20 where it immediately exchanges heat with the product end of the tubes 12, producing, for example, a catalyst bed temperature of 500 to 550° C. at the product end. The gas cools as it travels through the reactor shell countercurrently to the flow of reactants in tubes 12, giving up sensible heat to the catalyst beds as the endothermic reaction within the beds proceeds. The heating gas then exits the reactor at the feed end of the tubes through line 21, producing a temperature within the feed end of the catalyst beds of, for example, 400 to 450° C. This method of supplying heat to the reaction would not use a condensable heat transfer fluid but would use a noncondensable gas, such as hot flue gas.

A further feature of our invention is the use of steam as the purge gas and to repressurize the catalyst beds. We have found that the adsorbent developed for high temperature (300–500° C.) sorption of $CO_2$ are very stable in the presence of steam. Accordingly, by using steam within this temperature range to purge the adsorbent of $CO_2$ and sweep residual gases from the spaces between the particles of catalyst and adsorbent, and then repressurizing the catalyst beds with steam, one is able to eliminate the second purge step and thereby shorten the overall cycle. The purge step is carried out at ambient or subambient pressure and at the temperature used for the entire cycle. Repressurization brings the reactor back to reaction pressure of 50 to 300 psig. In this way it is possible to eliminate hydrogen purge and repressurization with hydrogen, thereby eliminating the partial loss of hydrogen which would have been used in these steps. Since steam is a reactant, no foreign materials are introduced into the reactor, and although the water content of the product hydrogen is increased, this is easily removed by condensation. This feature of the invention is so beneficial to the efficiency of the SERP process that it can be used in combination with the catalyst-sorbent configuration and temperature gradient features or independently. Preferably, however, all three features are used together to enhance efficiency for the SER process and reduce capital costs.

One way in which the use of steam purge and repressurization can reduce capital costs is by eliminating the second purge step which is carried out with hydrogen. By completely eliminating this step, the overall cycle time is shortened to the point that where three reactors would be required as shown in Table 3, two reactors could be used for the same duty as illustrated in Table 6.

TABLE 6

| Reactor 1 | Sorption-Reaction | | De-Pressurize | Purge | Pressurize |
|---|---|---|---|---|---|
| Reactor 2 | De-Pressurize | Purge | Pressurize | Sorption-Reaction | |

The $CO_2$ adsorbent can adsorb both $CO_2$ and $H_2O$. By using steam for both purging and pressurization, the adsorbent is kept saturated with water and the high pressure steam introduced with the feed during the reaction step is not wasted by simply being adsorbed onto the adsorbent. The presence of steam at the product end of the bed also tends to reduce methane slip from the reactor into the product hydrogen. The reason for this is that if the product end of the reactor tubes become too dry, as they have a tendency to do with a dry purge gas system, methane entering this portion of the catalyst beds tends to pass directly to the product and lower the hydrogen purity.

As a purge gas, steam has an economic advantage over methane and nitrogen, two alternative purge gases. Steam is 16 to 21 times less expensive than methane per unit volume on an energy basis and about 10 times cheaper than non-cryogenic nitrogen. The use of steam as the purge gas also lowers both capital and operating costs in those operations which use subatmospheric pressures for the purge step. Since steam can be cooled and condensed out of the purge gas effluent before it passes to a vacuum pump, only the inert gases, which represent only about 5 to 15 volume percent of the purge gas effluent, are actually passed through the vacuum pump, thereby enabling provision for a pump of lower capacity and cost.

The use of steam as the purge gas and for pressurization of the reactor at temperatures in the operating range of 300 to 500° C. can cause oxidation of the Ni-based reforming catalyst. An additional feature of this aspect of the invention is the use of a small amount of reducing gas, preferably hydrogen, to prevent such oxidation. An amount of $H_2$ of about 3 to 30 volume percent in the steam will perform this service. It is preferred, therefore, to purge the catalyst and adsorbent and pressurize these beds with steam containing a minimal but reducing amount of hydrogen.

The process of the invention can be combined with energy recovery heat exchange between process streams, fuel gas production, and subsequent PSA purification operations. Feed streams, purge gases, and pressurization gases can be preheated to the desired reaction temperature by heat exchange with hot product gases from the reactors or by hot flue gas used to supply heat for the reaction. Other energy saving steps can be taken without departing from the scope of the invention.

Figure 6:
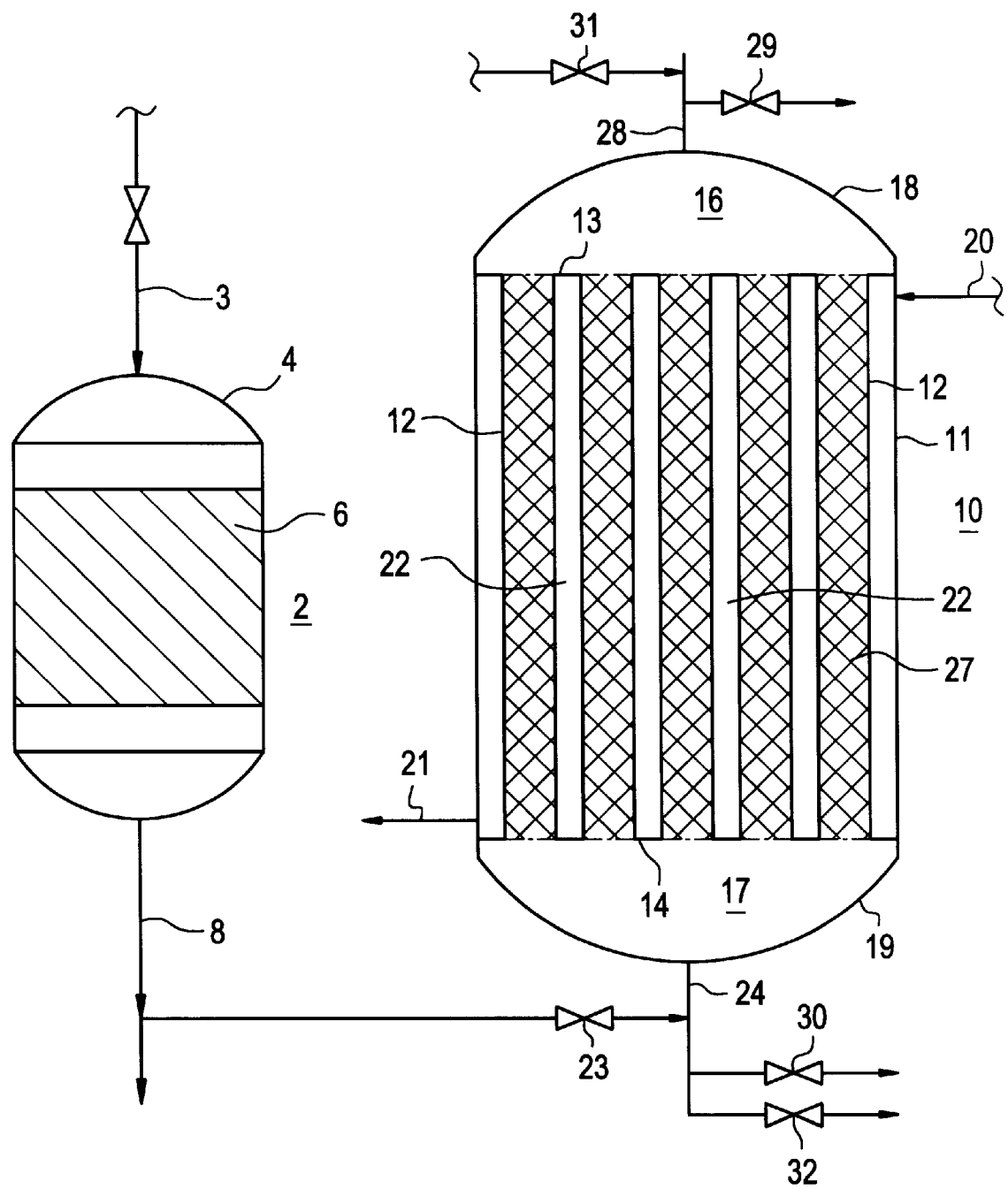
FIG. 6 is a schematic illustration of an embodiment of the present invention wherein the catalyst zone and the catalyst/adsorbent zone are in separate reaction vessels.

In a second embodiment, catalyst and a mixture of catalyst and adsorbent are packed into separate process vessels. A schematic of this embodiment is illustrated in FIG. 6. It consists of an adiabatic pretreatment reactor 2 and an assembly of two or more shell-and-tube SER reactors 10 (in parallel arrangement). The adiabatic pretreatment reactor 2 consists of an insulated vessel 4 packed with prereforming catalyst 6. There is no need to provide or remove energy from this reactor. The effluent line 8 from the reactor is connected to the assembly of two or more SER reactors 10 through isolation valves 23 which are of the SER process package. The SER reactors are packed entirely with a mixture of reforming catalyst and $CO_2$ adsorbent 27 in a ratio of 1:5 to 5:1. As in the previous case, the reactors are shell-and-tube design, with solid packing on the tube side and a heating fluid on the shell side.

In this embodiment the natural gas feed is preheated (to 260–400° C.) in a coil, hydrotreated/desulfurized as in conventional reforming technology, mixed with steam to a steam/carbon ratio of 3.0–8.0 and further preheated. The preheated steam-hydrocarbon mix enters the pretreatment reactor 2 which is simply an adiabatic vessel 4 packed with prereforming catalyst 6. There is no adsorbent in this reactor. All hydrocarbons heavier than methane get converted to $CH_4$ and $CO_2$, and a gas mixture at chemical equilibrium exits the pretreatment reactor as a mixture of $CH_4$, $H_2O$, $CO_2$, $H_2$ and traces of CO and $C_{2+}$. This gas is fed to the SER reactors 10. The overall process steps associated with the SER reactors are identical to those described above and shown in FIG. 1.

The adiabatic pretreatment reactor 2 is operated at the same pressure as the SER reactor 10. Enough catalyst is provided in this reactor to achieve complete equilibrium conversion of the feed gas at the exit temperature of the reactor. The feed gas 3 to the adiabatic pretreatment reactor 2 is preheated to a temperature sufficient to produce equilibrated effluent gas at the same temperature as the feed end of the SER reactor. If operated in this manner, the effluent gas 8 from the adiabatic pretreatment reactor will consist of equilibrated gas at the same temperature and pressure as the feed-end of the SER reactor. This gas would be identical to gas produced with a separate zone of catalyst in the SER reactor. (The embodiment shown in FIG. 1.) Thus, the SER reactor for the proposed reactor configuration will not exhibit a rear RMTZ, and inefficiencies due to $CO_2$ adsorption or void gases in this zone will be nonexistent. The adiabatic pretreatment reactor will also handle higher alkanes in the same manner as the embodiment of FIG. 1, so the major advantages of that case would be preserved with this new configuration.

Preheating requirements for the feed gas to the adiabatic pretreatment reactor will vary with the desired feed-end temperature of the SER reactor, the operating pressure of the reactors, the steam-to-carbon feed ratio, and the composition of the hydrocarbon feed gas. For natural gas, the effluent gas from the pretreatment reactor is colder than the feed to the same reactor since the heat for the endothermic reforming reaction (of methane) comes from the sensible heat of the feed gas. For gases heavier than $C_4$, such as naphtha, the exit will be warmer than the entrance because of the significant amount of methane generation. In any case conditions are chosen such that the equilibrated effluent gas from the pretreatment reactor is at the same temperature as the desired sorption-reaction temperature of the SER reactors (at feed end). The highest level of preheat will be required for feedstock consisting of natural gas. Estimates of the required feed gas temperature to the adiabatic pretreatment reactor are listed in Table 7 for a natural gas feed containing 90% $CH_4$, 5% $C_2H_6$, 5% $C_3H_8$, and 0.1% $CO_2$. The maximum operation temperature for typical commercial prereforming catalysts is 550° C., and the data in Table 7 show that preheating the gas (6:1 steam to carbon) to this level will yield an equilibrated effluent gas around 465° C. This is higher than the typical feed temperature envisioned for the SER reactors, indicating that the adiabatic pretreatment reactor will be capable of producing the appropriate effluent gas for feeding the SER reactors. The level of feed gas preheat is greater in this embodiment than in the embodiment of FIG. 1, since in the latter energy is also provided by heat transport from the shell side of the SER reactors.

TABLE 7

Preheat Requirements for Adiabatic Pretreatment Reactor to Yield Equilibrated Effluent Gas at 20 atm; Natural Gas Feed containing 90% $CH_4$, 5% $C_2H_6$, 5% $C_3H_8$, 0.1% $CO_2$

| Temperature of Equilibrated Gas out of Pretreatment Reactor (° C.) | Steam/Carbon Ratio of Feed Gas | Required Preheat Temperature (° C.) |
| --- | --- | --- |
| 465 | 6:1 | 550 |
| 400 | 6:1 | 447 |
| 400 | 3:1 | 437 |

This process configuration provides the benefits of lower catalyst volume than the cumulative volume of catalyst in zone 1 of the embodiment in FIG. 1, further reduction of void volume in the SER reactors, smaller SER reactor lengths, and higher accessibility for catalyst removal/packing. The pretreatment reactor in the embodiment of FIG. 6 operates continuously and does not undergo the cyclic reaction-depressurization-purge-pressurization steps of the SER reactors. Thus the void gas loss during the depressurization step is less in the embodiment of FIG. 6 compared to that of FIG. 1.

The following example is provided to assist in the understanding of our invention, but the details are illustrative only and should not be construed to limit our invention.

Illustrative Embodiment

A shell and tube reactor, such as shown schematically in FIG. 1, is loaded with a particulate 30–60% nickel-alumina steam-methane reforming catalyst in the lower 20 volume percent of the tubes. The upper 80 volume percent of the tubes is loaded with a 50/50 mixture of the reforming catalyst and pelletized potassium carbonate promoted hydrotalcite adsorbent. A feed stream of steam and methane in a mole ratio of 6 to 1, steam to methane, is fed at a pressure of 55 psig to the lower end of the tubes at a preheated temperature of 450° C. In the lower, adsorbent-free sections of the catalyst beds both steam-methane reforming reaction and water gas shift reactions take place to form a gas mixture of steam, methane, hydrogen, $CO_2$ and CO in the proportions given in Table 4. This gas mixture is passed into the upper sections of the reactor tubes where it encounters the mixture of catalyst and adsorbent at a pressure of 55 psig and temperatures progressing from 450 to 480° C. Carbon dioxide as it is formed is removed from the reaction zone by the adsorbent, and about >80 percent of the methane is converted by the SMR and WGS reactions. Product containing >95 mole percent hydrogen, <5 mole percent methane, and <50 ppm carbon oxides is withdrawn from the upper end of the reactor as product.

As soon as the carbon oxide content of the product hydrogen reaches 50 ppm, the reaction-sorption step of the process is terminated, the feed and product valves are closed, and an exhaust valve is opened at the bottom of the reactor in order to drop the pressure in the reactor tubes to atmospheric. When the pressure reaches 0 to 5 psig, a valve at the top of the reactor is opened to introduce steam at about 480° C. as a purge gas which is exhausted through a valve and line communicating with the lower ends of the reactor tubes. After an interval of time, the lower exhaust valve is closed and about 480° C. steam at 55 psig is introduced into the tubes to repressurize the reactor to 55 psig. The length of the purge interval of time is such that when combined with the depressurization and pressurization steps, the time of these three steps equals the time allowed for the reaction-sorption step. Steam used for purge and pressurization contains 4 mole percent hydrogen.

Meanwhile, in a second reactor identical to that described above, the same steps of reaction-sorption, depressurization, purge, and repressurization are taking place under the same conditions except offset in point of time so that at all times product hydrogen is being removed from one or the other reactor. The timing sequence is that shown in Table 6.

Since the endothermic reforming reaction predominates in the catalyst beds, heat is supplied to the reactor tubes by introduction of flue gas into the top of the shell at a temperature of 500° C. and withdrawn from the bottom of the shell at a temperature of 450° C. throughout the complete cycles of both reactors.

Other embodiments, advantages and features of our invention will be apparent to those skilled in the art from the foregoing disclosure without departing from the spirit or scope of the invention.

What is claimed is:

1. A process for steam reforming of hydrocarbon to produce hydrogen which comprises:

(a) passing a feed stream comprising steam and hydrocarbon into a first reaction zone containing particulate material consisting essentially of reforming catalyst under conditions of temperature and pressure effective to convert a portion of said steam and hydrocarbon into a gaseous mixture comprising hydrogen and carbon dioxide;

(b) passing said gaseous mixture from said first reaction zone into a second reaction zone containing particulate material which consists essentially of a mixture of reforming catalyst and adsorbent capable of separating carbon dioxide by adsorption from said gaseous mixture under the conditions of temperature and pressure of step (a);

(c) maintaining conditions of temperature and pressure in said second reaction zone essentially the same as in said first reaction zone, thereby further converting said steam and hydrocarbon from said first reaction zone into carbon dioxide and hydrogen and adsorbing carbon dioxide with said adsorbent;

(d) withdrawing from said second reaction zone a product stream predominantly containing hydrogen and continuing steps (a) through (d) for a first time interval;

(e) at the end of said first time interval simultaneously reducing the pressure in said first and second reaction zones in order to release carbon dioxide partially from said adsorbent and withdrawing carbon dioxide from said second zone in a direction countercurrent to the flow of reactants in steps (a) through (d), so that carbon dioxide passes through said first zone for a second time interval;

(f) at the end of said second time interval purging said adsorbent of carbon dioxide by passing a purge gas through said second zone and into and through said first zone in a direction countercurrent to the flow of reactants and product during steps (a) through (d) for a third time interval;

(g) at the end of said third time interval simultaneously repressurizing said first and second reaction zones with a nondeleterious gas to a pressure comparable to that of steps (a) through (d); and (h) at the completion of step (g) repeating at least steps (a) through (d).

2. The process of claim 1 wherein said first and second reaction zones are contained within a first reactor and multiple parallel reactors cooperatively joined in the process so that as steps (a) through (d) are carried out in said first reactor, steps (e) through (g) are being carried out in one or more other reactors in parallel in a sequence which permits steps (a) through (d) to be carried out in another reactor on completion of the first time interval in said first reactor which then progresses through steps (e) through (g).

3. The process of claim 2 wherein said reactors are of shell and tube configuration with means to supply heating fluid to the shell side of said reactors and said first and second reaction zones are contiguous and contained within the tubes of said reactors.

4. The process of claim 1 wherein said hydrocarbon is primarily methane, said temperature is in the range of about 300 to 550° C., said pressure in steps (a) through (d) is in the range of about 50 to 400 psig, and in step (e) the pressure is reduced to about 1.9 to 25 psia.

5. The process of claim 4 wherein said temperature is in the range of 300 to 550° C. and is maintained throughout steps (a) through (g) by circulating a heating gas in indirect heat exchange with said catalyst and adsorbent.

6. The process of claim 1 wherein said feed stream has a steam to carbon mole ratio in the range of 2:1 to 8:1.

7. The process of claim 1 wherein said purge gas of step (f) is steam and said nondeleterious repressurization gas of step (g) is steam.

8. The process of claim 7 wherein said purge gas and said nondeleterious repressurization gas is steam containing a reducing amount of hydrogen sufficient to inhibit oxidation of said catalyst.

9. The process of claim 8 wherein the amount of hydrogen present in said steam is in the range of 3 to 30 mole percent.

10. The process of claim 4 wherein said temperature of steps (a) through (g) has an increasing gradient of about 20 to 100° C. from the beginning of said first reaction zone to the end of said second reaction zone.

11. A process for steam reforming of hydrocarbon to produce hydrogen which comprises:
   (a) continuously passing a feed stream comprising steam and hydrocarbon into a first reaction zone containing particulate material consisting essentially of reforming catalyst under conditions of temperature and pressure effective to convert a portion of said steam and hydrocarbon into a gaseous mixture comprising hydrogen and carbon dioxide;
   (b) passing said gaseous mixture from said first reaction zone into a second reaction zone containing particulate material which consists essentially of a mixture of reforming catalyst and adsorbent capable of separating carbon dioxide by adsorption from said gaseous mixture;
   (c) operating said first zone such that the effluent gas from the first zone is essentially at thermodynamic chemical equilibrium at the pressure and inlet temperature conditions of the second reaction zone;
   (d) withdrawing from said second reaction zone a product stream predominantly containing hydrogen and continuing steps (b) through (d) for a first time interval;
   (e) at the end of said first time interval, reducing the pressure in said second reaction zone in order to release carbon dioxide partially from said adsorbent and withdrawing carbon dioxide from said second zone in a direction countercurrent to the flow of reactants in steps (b) through (d), for a second time interval;
   (f) at the end of said second time interval purging said adsorbent of carbon dioxide by passing a purge gas through said second zone in a direction countercurrent to the flow of reactants and product during steps (b) through (d) for a third time interval;
   (g) at the end of said third time interval repressurizing said second reaction zone with a nondeleterious gas to a pressure comparable to that of steps (b) through (d); and
   (h) at the completion of step (g) repeating at least steps (b) through (d).

12. The process of claim 11 wherein said first and second reaction zones are contained in separate reactors.

13. The process of claim 12 wherein the said first zone is contained in a single adiabatic pretreatment reactor and wherein the reactor operates continuously receiving a feed gas and producing a product gas which forms the feed gas to the second zone.

14. The process of claim 12 wherein said second reaction zone is contained in multiple parallel reactors cooperatively joined in the process so that steps(b) to (d) are carried out in the first reactor while steps (e) through (g) are carried out in one or more other reactors in sequence.

15. The process of claim 12 wherein the reactors of the second zone are of shell and tube configuration with means to supply heating fluid to the shell side of said reactors.

16. The process of claim 11 wherein said hydrocarbon is primarily methane, said temperature is in the range of about 300 to 550° C., said pressure in steps (a) through (d) is in the range of about 50 to 400 psig, and in step (e) the pressure is reduced to about 1.9 to 25 psia.

17. The process of claim 16 wherein said temperature of the second zone is in the range of 300 to 550° C. and is maintained throughout steps (a) through (g) by circulating a heating gas in indirect heat exchange with said catalyst and adsorbent contained in said second zone.

18. The process of claim 11 wherein said feed stream has a steam to carbon mole ratio in the range of 2:1 to 8:1.

19. The process of claim 11 wherein said purge gas of step (f) is steam and said nondeleterious repressurization gas of step (g) is steam.

20. The process of claim 19 wherein said purge gas and said nondeleterious repressurization gas is steam containing a reducing amount of hydrogen sufficient to inhibit oxidation of said catalyst.

21. The process of claim 20 wherein the amount of hydrogen present in said steam is in the range of 3 to 30 mole percent.

22. The process of claim 16 wherein said temperature of steps (b) through (g) has an increasing gradient of about 20 to 100° C. from the beginning of said second reaction zone to the end of said second reaction zone.

23. In a process for steam reforming hydrocarbon using a fixed bed of particulate reforming catalyst mixed with particulate adsorbent for carbon dioxide, wherein carbon dioxide is adsorbed and separated from the reaction zone substantially as the carbon dioxide is formed in the reaction zone and hydrogen is withdrawn from said bed as a product of the process, said bed is periodically depressurized and purged with a purge gas to remove carbon dioxide from said adsorbent and regenerate said adsorbent for reuse in the reaction, following which said bed is repressurized with a nondeleterious gas, the improvement wherein said purge gas and said repressurizing gas is steam containing a reducing amount of hydrogen only sufficient to protect said catalyst from oxidation.

24. The process of claim 1 wherein the catalyst and adsorbent in said second reaction zone are present in a volume ratio of 5:1 to 1:5.

* * * * *